United States Patent Office 3,029,145

Patented Apr. 10, 1962

3,029,145

PREPARATION OF POLYMER RESIST IMAGES

Dewey M. Dumers and Carl E. Diener, Binghamton, N.Y., assignors to General Aniline & Film Corporation, New York, N.Y., a corporation of Delaware No Drawing. Filed June 9, 1960, Ser. No. 34,874
9 Claims. (Cl. 96—35)

This invention relates to photopolymerization and in particular to the production of polymeric photographic images in which ferrous ions remaining after the development of an exposed silver halide emulsion are used in the presence of a per compound to effect polymerization of an unsaturated polymerizable organic compound.

It is known that the polymerization of certain monomeric vinyl compounds, particularly the more reactive specie, can be initiated by exposure to high intensity radiation such as ultra-violet rays of the type emanating from sunlight or a carbon arc. This radiation-induced polymerization is termed photopolymerization. Thus, it has been reported that methyl acrylate on long standing in sunlight is transformed into a transparent, odorless mass of density of 1.22; and, in this connection, reference is made to Ellis's "The Chemistry of Synthetic Resins," volume II, page 1072 (1935). It is to be noted that photopolymerization, that is, polymerization induced by the action of light or similar radiation, proceeds at a very much slower rate than polymerization brought about by a peroxide catalyst or heat. Moreover, the use of light, unaided by other agents, tends to result in a low molecular weight polymer.

An especially valuable and intriguing application of photopolymerization is in the field of photography in which a light image or other radiation patterns are used to bring about imagewise polymerization of monomeric substances. The general technique involves coating a suitable base or support with a monomer or mixture of monomers followed by exposure through a pattern to a high intensity light source. In the exposed areas, the monomer is polymerized to a more or less hard and insoluble mass, whereas the unexposed areas are unaffected and consist of the original monomer which is removed usually by a simple washing operation. There is thus obtained in the exposed areas a polymeric photographic image or raised resist of insoluble polymer or copolymer.

However, the above-described systems are handicapped by low photographic speed; that is, excessively long exposure times are required in order to sufficiently toughen or polymerize the monomer in the exposed areas to prevent its being washed away with the monomer in the unexposed areas. Furthermore, the low speed of these systems necessitates the use of extremely high intensity radiations, and, in general, carbon arcs or bright sunlight are commonly resorted to.

Numerous polymerization systems have been investigated, and many different compounds studied, always with the view toward the greater speed. For instance, in United States Patent 2,610,120 is described the use of light-sensitive polymeric cinnamic acid esters such as polyvinyl cinnamate sensitized with various nitro compounds. The function of the nitro compound is to increase the speed. According to one example of this patent, a coating incorporating such light-sensitive esters requires an exposure time using a line or half-tone image of one minute placed at a distance of 4 feet from a 35 ampere white flame carbon arc. In another reference, United States Patent 2,673,151, the use of sulfur compounds is proposed to accelerate the photopolymerization of light-sensitive monomeric substances. According to this document, a coating consisting of a copolymerizable mixture of polyesters of alpha-beta ethylenic, alpha-beta dicarboxylic acids and ethylenically unsaturated compounds copolymerized therewith is subjected to prolonged exposure under a pattern of light. Under the action of the light, a gel-like polymer is produced in the exposed areas which can be heat treated to effect the final curing. The light source, it is worth noting, is of a high intensity type such as sunlight or a carbon arc, that is, a source rich in ultraviolet radiation.

A system of photopolymerization which represents a striking advance in the above-described prior art is disclosed in a pending United States application, Serial Number 808,882, filed April 27, 1959, in the name of Helene D. Evans. In this application, photopolymerization of unsaturated organic compounds is rapidly brought about by contacting the polymerizable material in the presence of a per compound with photo-generated ferrous ions. Because of its high photographic speed, this photopolymer system is extremely useful and valuable for the production of polymeric photographic images. Thus, according to the Evans disclosure, a radiation sensitive coating is prepared by applying to a suitable support a light-sensitive ferric salt and a polymerizable material such as an ethylenically unsaturated compound contained in a colloidal carrier. The resulting coating is then exposed to a light pattern whereby the ferric ions in the exposed areas are transformed to ferrous ions. The so-exposed coating which now contains an image of ferrous ions is then contacted with a peroxide or similar per compound whereby polymerization of the unsaturated compound rapidly takes place at the site of the ferrous ions which corresponds to the exposed areas. On removal by washing of the unexposed and therefore residual monomer layer, there is obtained a polymerized photographic relief image. The fact that the source of the illumination can be an incandescent tungsten lamp of 375 watts, and the time of exposure in the order of 15 to 30 seconds demonstrates the superiority of this system to the exceedingly slow systems of the prior art which, as previously pointed out, require an exposure period of the order of minutes with high intensity radiation.

The concept of employing a ferrous ion image to trigger photopolymerization, while a notable step forward, is not comparable in speed to silver halide light-sensitive materials. In the iron salt-monomer system, it is generally agreed that one quantum of radiant energy is required to produce one ferrous ion. As a consequence, the quantum efficiency of this part of the iron monomer system can never exceed 1. In other words, there is no amplification factor as there is in silver halide emulsions wherein a feeble exposure can produce a latent image capable of controlling or modulating the chemical reaction during development. While there appears to be in the case of the iron monomer system a slight amplification in the polymerization phase or step, it is not, as far as it is known, of a high order.

A method has now been discovered whereby it becomes possible to utilize the high amplification or intensification factor of a modern high-speed silver halide emulsion to greatly increase the speed of photopolymeric systems, and the provision of such method constitutes the objects and purposes of this invention.

In accordance with our invention, we expose a light-sensitive sliver halide emulsion and form therein a latent image. The exposed emulsion is then developed in a developer which contains as the developing agent a ferrous oxalate salt. In the exposed areas, the silver halides are reduced to a silver image while simultaneously ferric ions are formed in imagewise quantities at the sites of the silver image. In the non-exposed areas, there remains residual ferrous ions or what might be referred to as a residual ferrous ion image since the ferrous ions of the developer have been removed in imagewise proportions by oxidation to the ferric state during the development reaction. This residue of ferrous ions or the ferrous ion image is then contacted with a polymerizable organic compound in the presence of a per compound whereby energetic, and vigorous polymerization takes place in proportion to the amount of ferrous ions which in turn is governed by the exposure given to the silver halide emulsion. A final step is employed to remove the unpolymerized material which corresponds to the exposed portions of the silver halide emulsion.

The method is positive working in that areas of high exposure which produce many ferric ions result in no polymerization whereas areas of low exposure which leave many unoxidized ferrous ions produce extensive polymerization.

Thus, the instant invention harnesses the tremendous amplification factor of high-speed photographic emulsions to trigger or supply the energy to bring about extremely rapid photopolymerization. As a consequence, it is now possible to fabricate a photopolymerization system, the speed and sensitivity of which are limited only by the photographic characteristics of the silver halide emulsions employed to modulate the photopolymerization reaction.

The inorganic developing agents, as represented by ferrous oxalate, are known developers for silver halide photography; and in this connection reference is made to "The Theory of the Photographic Process," revised edition by C. E. Kenneth Mees, pages 535, 538 and 539. Although we have found ferric oxalate to be generally suitable for our developer formulations, other ferrous salts of organic acids can be employed as exemplified by ferrous salts of lactic, salicylic, citric, tartaric, formic, succinic, boric and related acids. All that is required is that the ferrous salt developer effect development to a silver image of the exposed silver halide emulsion with concomitant production of imagewise quantities of ferric ions and corresponding imagewise reduction of the ferrous ion content of the developer.

Examples of suitable per compounds useful in practicing the invention include: hydrogen peroxide, aliphatic hydroperoxides, i.e., methyl hydroperoxide, octyl hydroperoxide, trans-decalin hydroperoxide, 1-methylcyclopentyl hydroperoxide, 1,1-dimethyl-2-propenyl hydroperoxide, 2-cyclohexene-1-hydroperoxide, cumene hydroperoxide, tetraline hydroperoxide, triphenyl methyl hydroperoxide, etc.; peroxides of the formula ROOR' wherein R and R', which may or may not be alike, can be alkyl such as methyl, ethyl, propyl, butyl, pentyl, hexyl, heptyl, octyl, nonyl, decyl, undecyl, etc.; aralkyl, i.e., benzyl, phenethyl, phenylpropyl, naphthylmethyl, naphthylethyl, naphthylpropyl, etc.; aryl such as phenyl, naphthyl, etc.; aliphatic acyl such as acetyl, propionyl, butyryl, valeryl, etc.; aromatic acyl such as benzoyl, naphthoyl, etc.; peroxy acids, i.e., aliphatic peroxy acids, e.g., peracetic acid, perpropionic acid, perbutyric acid, etc.; aromatic peroxy acids, i.e., perbenzoic acid, perphthalic acid, etc.; esters of the aforesaid peroxy acids; salts of peracids such ammonium persulfate, etc. Such per compounds are well known, and their description and preparation can be found in the chemical literature; and, in this connection, reference is made to such well-known works as "Organic Peroxides," by Arthur V. Tobolsky and Robert B. Mesrobian and published by Interscience Publishers, Inc., New York, and Interscience Publisher Ltd., London (1954).

Any normally liquid to solid photopolymerizable unsaturated organic compound is applicable in the practice of my invention. Preferably, such compounds should be ethylenically unsaturated, i.e., contain at least one non-aromatic double bond between adjacent carbon atoms. Compounds particularly advantageous are the photopolymerizable vinyl or vinylidene compounds containing a $$CH_2{=}C<$$

group activated by direct attachment to a negative group such as halogen, $>C{=}O$, $-C{\equiv}N$, $-C{\equiv}C$, $-O-$, or aryl. Examples of such photopolymerizable unsaturated organic compounds include: acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile and the like.

The above ethylenically unsaturated organic compounds, or monomers as they are sometimes called, may be used either alone or in a mixture in order to vary physical properties such as molecular weight, hardness, etc. of the final polymer. Thus, it is a recognized practice, in order to produce a vinyl polymer of the desired physical properties, to polymerize in the presence of a small amount of an unsaturated compound containing at least two terminal vinyl groups each linked to a carbon atom in a straight chain or in a ring. The function of such compounds is to cross-link the polyvinyl chains. This technique, as used in polymerization, is further described by Kropa and Bradley in volume 31, Number 12, of Industrial and Engineering Chemistry (1939). Among such cross-linking agents for the purpose described herein may be mentioned N,N'-methylene-bis-acrylamide, triallyl cyanurate, divinylbenzene, divinylketones and diglycol diacrylate. Generally speaking, increasing the quantity of cross-linking agents increases the hardness of the polymer obtained in the range wherein the ratio of monomer to cross-linking agent varies from 10:1 to 50:1.

The photopolymerization as described herein can be carried out under a wide variety of conditions employing numerous modifications. One valuable application of our process, for example, is the production of relief printing plates for use in the graphic arts. Such plates can be fabricated by coating a mixture of monomer or monomers and a silver halide emulsion on a suitable base or support. The resulting coating, after exposing to a radiation source such as an incandescent bulb is then developed with a developer containing a ferrous salt developing agent. The so developed coating is then contacted or treated with a per compound to effect polymerization in those areas corresponding to low or no exposure. Fixing of the polymeric relief image is effected by washing to remove the unreacted or unpolymerized monomers in the unexposed areas. A resist is thus formed of the photopolymerized polymer which can be used as a positive working relief plate. By employing a hydrophilic surface as a support for the coating such as a partially saponified cellulose acetate, a plate is produced having areas of varying ink receptivity and water receptivity. Such a plate can then be used as a positive working offset plate for the production of printed copies. In the above illustration monomers are so chosen that the photoresists obtained constitute the ink receptive portion of the offset plate.

In the field of photography, our invention can be used, for example, for the production of black and white prints. Thus, a light sensitive plate is prepared having coated thereon a layer comprising an unsaturated organic compound, a silver halide emulsion and a finely divided black pigment. This plate is then exposed, after which development is effected by means of a ferrous salt developer. The plate is then treated with a per compound to effect polymerization in the unexposed areas followed by washing with water to remove unpolymerized monomer in the exposed regions. There is thus obtained a positive polymeric photographic image composed of pigmented polymer.

In some instances as previously pointed out it may be desirable to employ hydrophilic colloid as a carrier for the light sensitive layer or monomer and silver halide emulsion. Suitable colloidal carriers for this purpose include polyvinyl alcohol, casein, glue saponified cellulose acetate, carboxy methyl cellulose, starch and the like.

Another photographic application of this invention is in the field of color reproduction. For instance, a light sensitive plate is prepared as described above, i.e., containing a monomer and a light sensitive silver halide emulsion. It is then exposed to one of the primary color aspects of a subject. After development and treatment with a per compound to effect polymerization in the unexposed areas, the so obtained polymerized image is then subtractively dyed. By exposing other light sensitive coatings to the remaining primary color aspects of the subject, processing as described above to effect polymerization in the unexposed areas followed by dyeing with the appropriate subtractively color dye and superimposition of the resulting colored resists, a color reproduction of the original subject is thereby obtained.

Other uses of the above photopolymers include such photographic and lithographic applications as, for example, the production of bimetallic printing plates, etched copper halftone images, printing plates having cellulose ester uspports, grained zinc or aluminum lithographic plates, zincated lithographic printing plates, ungrained copper printing plates for preproofing copper chromium bimetallic plates, etc.

Numerous materials are suitable as supports or bases for the radiation sensitive plates prepared in accordance with the process described herein, and in this connection reference is made to cellulose ester supports, including the hydrophobic variety of the type having a surface made hydrophilic by partial saponification, metal such as aluminum or zinc, terephthalic acid ester polymers, paper, glass or the like. A further advantage of our photosensitive coatings and materials arises as a result of their stability so that they are not adversely affected on storage under conditions of excessively high humidity and temperature. In this respect, the new materials are superior to the old bichromated glue or albumen layers of the prior art which must be prepared in sensitized form just prior to usage because of their poor keeping qualities. It has been previously pointed out that by using a silver halide photographic emulsion to trigger our photopolymerization system a tremendous advantage in speed is thereby obtained, in fact, a speed essentially equal to that of photographic emulsion itself. Another highly important advantage arising from the use of a silver halide emulsion to trigger photopolymerization is the fact that the silver halide emulsion can be sensitized by the use of optical sensitizers with the result that a tremendous spectral range can be used to effect photopolymerization. As a consequence, it now becomes possible to employ a wide variety of electromagnetic frequencies for the production of polymeric photographic images.

The sensitization of silver halide emulsion is, of course, well known in the photographic art and one has but to refer to the numerous patents and publications in this field for the formulation of a great variety of sensitized silver halide emulsions for all manner of applications.

It can thus be seen that the present system has the following important advantages: (1) it is positive working; (2) it is possessed of high light sensitivity, and (3) the compositions can be sensitized to the desired portion of the electromagnetic spectrum. Such advantages represent decided improvements over the existing photopolymerization systems. Other advantages and assets will be apparent to those skilled in the art to which the invention pertains.

In the following examples are illustrated various ramifications and aspects of our invention, although it is to be understood that the invention is not restricted thereto.

*Example I*

6 grams of a gelatin silver chloride emulsion is mixed with a solution containing 0.5 g. of N,N'-methylene-bis-acrylamide dissolved in 50 cc. of 5% gelatin. The mixture was coated on baryta paper.

The dried coating was then exposed through a line positive to form a latent silver image. The coating was then dipped for 5 seconds in a developer of the following composition:

| | | |
|---|---|---|
| Potassium oxalate | g | 3.0 |
| Ferrous sulfate ($FeSO_4.7H_2O$) | g | 1.0 |
| Water | ml | 100 |

The coating was removed from the developer and allowed to stand for 1 minute in the air. It was then placed for a few seconds in 1% $H_2O_2$ followed by a water washout.

A resist was left in those areas corresponding to non-exposure, whereas no resist was left in the areas of exposure.

The resist may be converted to an image of high optical opacity by placing in any conventional black and white developer whereby the resist is made visible by the development of image silver.

*Example II*

The same formulation was prepared as given in Example I but with the addition of a dispersion of oil containing a blue black dye (nigrosine).

After exposure, development, peroxide and washout a black dye resist is left without need of further treatment to be made visible.

*Example III*

8 grams of a silver chloride emulsion was sensitized to the green region of the spectrum. It was mixed with 0.5 g. of N,N'-methylene-bis-acrylamide and 4 g. of acrylamide dissolved in 50 cc. of 5% gelatin, and coated on paper base. The dried coating was exposed to a letter positive through a green filter and developed as in Example I; a positive resist corresponding to the original was obtained.

*Example IV*

16 grams of a pure silver bromide emulsion was mixed with 0.5 g. of N,N'-methylene-bis-acrylamide and 4 g. of acrylamide dissolved in 50 cc. of 5% gelatin and coated on paper base.

Upon exposure to a microfilm positive in an enlarger for a few seconds to give a latent silver image, the paper was placed for 10 seconds in the following developer:

| | | |
|---|---|---|
| Potassium oxalate | g | 3.0 |
| Ferrous sulfate ($FeSO_4.7H_2O$) | g | 1.0 |
| Hypo (anhydrous) | g | 0.5 |
| Water | ml | 100 |

The coating was removed and allowed to stand for 1 minute in the air followed by a few seconds immersion in a 1% $H_2O_2$ solution.

A letter positive enlargement in resist was obtained upon washout.

As previously pointed out, our invention as described herein can be practiced using any of the silver halide emulsions known in the art and include those photographic emulsions containing such adjuncts as sulfur sensitizers, reduction and metal sensitizers, noble metal sensitizers, polyoxyethylene and the like.

We claim:

1. A process of producing a polymeric photographic image which comprises exposing to a pattern of actinic radiations a silver halide photographic emulsion, developing the so exposed emulsion with a ferrous salt developing agent to produce in the exposed areas a silver image and a ferric ion image and in the unexposed areas an image of residual ferrous ions, contacting the ferrous ion image in the presence of a per compound having the grouping —O—O— with a normally liquid to solid ethylenically unsaturated monomer compound whereby polymerization of the ethylenically unsaturated monomer compound corresponding to the unexposed areas is effected in proportion to the amount of residual ferrous ions, and removing the unpolymerized monomer compound corresponding to the exposed areas.

2. A process of producing a polymeric photographic image which comprises exposing to a pattern of actinic radiations a photographic element comprising a base having thereon a radiation sensitive layer comprising a normally liquid to solid ethylenically unsaturated monomer compound and a silver halide photographic emulsion, developing the exposed element with a ferrous salt developer to form a silver image and a ferric ion image in the so exposed areas, anr a residual image of ferrous ions in the unexposed areas, treating the exposed and developed element with a per compound containing a —O—O— grouping whereby polymerization of the monomer compound corresponding to the unexposed areas occurs in proportion to the amount of residual ferrous ions and removing the monomer compound corresponding to the exposed areas.

3. The process as defined in claim 2 wherein the silver halide photographic emulsion is a gelatin silver halide photographic emulsion.

4. The process as defined in claim 1 wherein the ethylenically unsaturated compound is a vinyl compound.

5. The process as defined in claim 2 wherein is added to the unsiturated polymerizable organic compound a cross-linking agent having at least 2 terminal vinyl groups.

6. The process as defined in claim 5 wherein the cross-linking agent is selected from the class consisting of N,N'-methylene-bis-acrylamide, triallylcyanurate, divinylbenzene, divinylketones and diglycol-diacrylate.

7. The process as defined in claim 2 wherein the radiation pattern is modulated visible light.

8. The process as defined in claim 2 wherein the per compound is an organic peroxide.

9. The process as defined in claim 2 wherein the silver halide photographic emulsion is optically sensitized.

No references cited.